United States Patent
Heymer et al.

[15] 3,639,289
[45] Feb. 1, 1972

[54] PROCESS FOR THE MANUFACTURE OF NONCAKING BLENDS COMPRISING SODIUM TRIPOLYPHOSPHATE HEXAHYDRATE AND SODIUM NITRILO TRIACETATE MONOHYDRATE OR DIHYDRATE, AND THEIR USE AS DETERGENTS, CLEANSING OR RINSING AGENTS

[72] Inventors: Gero Heymer, Knapsack near Cologne; Herbert Landgraber, Lechenich; Karl Merkenich, Effern near Cologne, all of Germany

[73] Assignee: Knapsack Aktiengesellschaft, Knapsack near Cologne, Germany

[22] Filed: June 16, 1969

[21] Appl. No.: 833,666

[30] Foreign Application Priority Data

June 18, 1968 Germany ..................... P 17 67 780.4

[52] U.S. Cl. ........................... 252/137, 252/110, 252/138, 252/152, 260/534 E
[51] Int. Cl. ................... C11d 7/16, C11d 7/32, C11d 11/00
[58] Field of Search ........................ 252/110, 137, 138, 152

[56] References Cited

UNITED STATES PATENTS

| | | | |
|---|---|---|---|
| 3,356,613 | 12/1967 | Gedge | 252/137 |
| 3,324,038 | 6/1967 | Chaffee et al. | 252/152 |
| 3,247,118 | 4/1966 | Matthaei | 252/99 |
| 3,576,748 | 4/1971 | Petersson | 252/110 |
| 3,546,123 | 12/1970 | Stahlheber et al. | 252/137 |

FOREIGN PATENTS OR APPLICATIONS

| | | | |
|---|---|---|---|
| 1,056,408 | 1/1967 | Great Britain | 252/135 |

*Primary Examiner*—Leon D. Rosdol
*Assistant Examiner*—Dennis L. Albrecht
*Attorney*—Connolly and Hutz

[57] ABSTRACT

Production of noncaking blends comprised of sodium tripolyphosphate hexahydrate and sodium nitrilotriacetate monohydrate or dihydrate. The sodium tripolyphosphate is used in the form of its high- and/or low-temperature modification(s) and a fine mist of an aqueous sodium nitrilotriacetate solution having a temperature between about 0° and 80° C. is sprayed thereonto. When an excess of water is used, a gas and/or air stream is simultaneously passed over the sprayed material to evaporate the water in excess.

7 Claims, No Drawings

PROCESS FOR THE MANUFACTURE OF NONCAKING BLENDS COMPRISING SODIUM TRIPOLYPHOSPHATE HEXAHYDRATE AND SODIUM NITRILO TRIACETATE MONOHYDRATE OR DIHYDRATE, AND THEIR USE AS DETERGENTS, CLEANSING OR RINSING AGENTS

It is known the sodium tripolyphosphate hexahydrate can be used as a constituent of detergents, cleansing or rinsing agents. The hexahydrate can be produced, for example, by the process described in German published Specification 1 244 743. As taught therein, a fine mist of water having a temperature between about 0° and 60° C., preferably between about 5° and 15° C., is sprayed onto the sodium tripolyphosphate, which is used in the form of its high and/or low temperature modification(s). The water is used in a proportion larger than that theoretically needed for hexahydrate formation, and a gas stream, for example air, is simultaneously passed over the reaction material to evaporate the water in excess. The quantity of excess water and gas stream are balanced against one another so as to enable the reaction mixture to be maintained at a temperature between about 50° and 80° C., preferably between about 60° and 70° C., by the water's latent heat of evaporation. The water is used, for example, in an excess of up to substantially 30 percent, preferably about 10 to 25 percent.

More recent detergent, cleansing and rinsing agent formulations use the sodium tripolyphosphate hexahydrate in combination with sodium nitrolotriacetate monohydrate or dihydrate, whereby it is possible for the last-mentioned blend component to be used in the form of its monosodium salt, disodium salt or trisodium salt. Blends made from sodium tripolyphosphate hexahydrate and sodium nitrilotriacetate monohydrate or dihydrate, which are easy to produce by blending the dry salts, have poor storage properties. The hygroscopic properties of sodium nitrilotriacetate occasion this. The blends fairly soon lose their initial flowability and cake together. Detergents, cleansing or rinsing agents having such blends incorporated therein show the same phenomenon. Experiments were made using a customary pulverulent detergent which contained sodium tripolyphosphate hexahydrate and was dry-blended with 5 to 10 weight percent sodium nitrilotriacetate. In an atmosphere with 80 percent relative moisture and at a temperature of 25° C., the detergent was found to completely cake together and lose its initial flowability, after a 3-hour storage therein.

The use of blends made from sodium tripolyphosphate hexahydrate and sodium nitrilotriacetate monohydrate or dihydrate, for example, in detergent formulations, is highly desirable in view of the compounds' very good ability of binding lime, which however must not impair the flowability of the detergent. It is therefore the object of the present invention to provide a noncaking blend of sodium tripolyphosphate hexahydrate and sodium nitrilotriacetate monohydrate or dihydrate for use as a constituent of detergents, cleansing or rinsing agents having good flow properties.

It has unexpectedly been found that a noncaking blend consisting of sodium tripolyphosphate hexahydrate and sodium nitrilotriacetate can be produced by spraying a certain quantity of an aqueous sodium nitrilotriacetate solution onto anhydrous sodium tripolyphosphate so as to obtain the hexahydrate.

The process of the present invention for the production of a noncaking blend consisting of sodium tripolyphosphate hexahydrate and sodium nitrilotriacetate monohydrate or dihydrate comprises spraying a fine mist of an aqueous sodium nitrilotriacetate solution having a temperature between about 0° and 80° C. onto the sodium tripolyphosphate, which is used in the form of its high and/or low temperature modification(s) and may be cooled, if desired, the water being used in stoichiometric proportions or in proportions in excess of those theoretically needed for hexahydrate formation, and, in those cases in which an excess proportion of water is used, simultaneously flowing a gas and/or air stream over the sprayed material to evaporate water in excess, if any.

An advantageous feature of the process of the present invention comprises spraying an about 35 to 40 weight percent aqueous sodium nitrilotriacetate solution onto the sodium tripolyphosphate. The solution preferably has a temperature between about 10° and 70° C. In those cases in which the sodium tripolyphosphate is hydrated using an excess of water, the water should conveniently be used in an excess of up to 30 weight percent, preferably about 10 to 25 weight percent, based on the quantity theoretically needed to this effect.

During the spray step, the sodium tripolyphosphate to be sprayed with the above solution should conveniently be kept in permanent motion, for example inside a rotary tube, or by fluidizing it. In this latter case, the sodium tripolyphosphate is generally maintained in the fluidized state until it is completely hydrated.

The products obtained by the process of the present invention have perfect storage properties in those cases in which the hydrated final product contains between about 3 and 20 weight percent sodium nitrilotriacetate monohydrate or dihydrate. The products consist of powder particles having a hollow ball-structure which ensure good flowability and an advantageous apparent density between 0.35 and 1 kg./liter.

Apart from the advantages reported above and the nonhygroscopicity of the sodium nitrilotriacetate monohydrate or dihydrate blended with sodium tripolyphosphate hexahydrate, the present process also adds to the economy in the production of detergents, cleansing and rinsing agents. Sodium nitrilotriacetate is known to be obtainable by hydrolyzing nitrilotriacetonitrile with a sodium hydroxide solution. The sodium salt is initially obtained in aqueous solution and subsequently recovered therefrom by evaporation of the water. This evaporation step is omitted in the present process, wherein the aqueous sodium salt solution is directly sprayed onto anhydrous sodium tripolyphosphate with the resultant formation of the blend to be produced. Detergents, cleansing and rinsing agents having the salt mixture of the present invention incorporated therein possess good dissolution properties in water.

EXAMPLE 1

(Process of Invention)

A rotary tube was uniformly fed within 1 hour with 136 kg. sodium tripolyphosphate with 20 percent high-temperature modification and an apparent density of 0.45 kg./liter. 64 kg. of a 37.5 weight percent aqueous trisodium nitrilotriacetate solution were simultaneously sprayed using a spray box onto the sodium tripolyphosphate, which was agitated. The reaction mixture was maintained at about 35° C. by strong outside cooling. After a sojourn time of 40 minutes in the tube, completely dry reaction product was removed therefrom and sieved to eliminate particulate matter (about 3 weight percent) with a size larger than 2 mm. 194 kg. of a free-flowing product were obtained. It had an apparent density of 0.48 kg./liter and was composed of 68 weight percent sodium tripolyphosphate, 12 weight percent trisodium nitrilotriacetate and 20 weight percent water of crystallization.

EXAMPLE 2

(Process of Invention).

A rotary tube was uniformly fed within 1 hour with 316 kg. sodium tripolyphosphate with 50 percent high-temperature modification and an apparent density of 0.51 kg./liter. 184.3 kg. of a 40 weight percent aqueous trisodium nitrilotriacetate solution were simultaneously sprayed using a spray box onto the sodium tripolyphosphate, without outside cooling. The temperature of the reaction mixture which increased to about 65° C. was maintained constant by partial evaporation of the spray water (about 10 percent) and removal thereof by means of a weak stream of air. After a sojourn time of 45 minutes in the tube, the reaction product was removed therefrom and sieved to eliminate particulate matter with a size larger than 2 mm. 490 kg. of a free-flowing product were obtained. It has an apparent density of 0.54 kg./liter and was composed of 64.6 weight percent sodium tripolyphosphate, 15 weight percent trisodium nitrilotriacetate and 20.4 weight percent water of crystallization.

EXAMPLE 3

(Conventional Formulation of Detergent)

A detergent with the composition specified below was prepared. Anhydrous sodium tripolyphosphate and sodium nitrilotriacetate monohydrate together with the further detergent components were dry-blended in a mixing drum, and an aqueous solution of an alkylarylsulfonate (surface-active substance) was sprayed onto the blend so made to obtain the sodium tripolyphosphate hexahydrate. The water was used as a rate of 8 weight percent, based on the anhydrous sodium tripolyphosphate.

| | |
|---|---|
| Anhydrous sodium tripolyphosphate | 35 weight percent |
| Sodium nitrilotriacetate monohydrate | 5 weight percent |
| Surface-active substance (100% strength) | 22 weight percent |
| Silicates | 6 weight percent |
| Carboxymethylcellulose | 4 weight percent |
| Sodium perborate | 20 weight percent |
| Water | 8 weight percent |

The detergent so formulated, which as stored for 3 hours at 25° C. in an atmosphere with 80 percent relative moisture, was found to cake together into clotty material, i.e., to have poor flow properties.

EXAMPLE 4

(Detergent Formulation According to Invention)

A detergent with the composition specified below was prepared by dry-blending the detergent components in a mixing drum. The salt mixture comprised of sodium tripolyphosphate hexahydrate/sodium nitrilotriacetate monohydrate was produced in the manner described in Example 1 and introduced as a free-flowing powder into the detergent composition. The salt mixture was composed of:

| | |
|---|---|
| 68 weight percent | sodium tripolyphosphate |
| 12 weight percent | sodium nitrilotriacetate |
| 20 weight percent | water |

The detergent composition included the following components:

| | |
|---|---|
| Salt mixture of sodium tripolyphosphate hexahydrate and sodium nitrilotriacetate monohydrate | 40 weight percent |
| Surface-active substance (100% strength) | 22 weight percent |
| Silicates | 6 weight percent |
| Carboxymethylcellulose | 4 weight percent |
| Sodium perborate | 20 weight percent |
| Anhydrous sodium sulfate | 8 weight percent |

The detergent so formulated was stored for 12 weeks, in open and closed containers, at 25° C., in an atmosphere with 60 to 70 percent relative moisture, without caking together. The blend was found to have unchanged good flow properties.

EXAMPLE 5

(Detergent Formulation According to Invention)

A noncaking detergent was formulated in the manner described in Example 4, from the following components:

| | |
|---|---|
| Salt mixture of sodium tripolyphosphate hexahydrate and sodium nitrilotriacetate monohydrate | 20 weight percent |
| Surface-active substance (100% strength) | 22 weight percent |
| Silicates | 6 weight percent |
| Carboxymethylcellulose | 4 weight percent |
| Sodium perborate | 20 weight percent |
| Anhydrous sodium sulfate | 28 weight percent |

The composition (in percent) of the salt mixture was the same as that described in example 4. The resulting detergent was stored for 12 weeks at 25° C. and in an atmosphere with 60 to 70 percent relative moisture, without caking together. The blend was found to have unchanged good flow properties.

We claim:

1. In the process for the manufacture of a noncaking blend consisting essentially of sodium tripolyphosphate hexahydrate and sodium nitrilotriacetate monohydrate or dihydrate, wherein the blend contains between about 3 to 20 weight percent of said sodium nitrilotriacetate hydrates, the improvement which comprises agitating continuously anhydrous sodium tripolyphosphate and spraying onto said anhydrous sodium tripolyphosphate in a fine mist a solution of about 35 to 40 weight percent of sodium nitrilotriacetate in water at a temperature between 0° and 80° C., the water of the spray being in stoichiometric proportion for hexahydrate formation or in a proportion up to 30 weight percent greater than the stoichiometric proportion for hexahydrate formation.

2. The process of claim 1, wherein the aqueous sodium nitrilotriacetate solution has a temperature between about 10° and 70° C.

3. The process of claim 1, wherein the aqueous sodium nitrilotriacetate solution is sprayed onto the sodium tripolyphosphate while cooling the sodium tripolyphosphate.

4. The process of claim 1, wherein the water is used in an excess of about 10 to 25 weight percent, based on the quantity theoretically needed.

5. The process of claim 1, wherein the sodium tripolyphosphate is kept in motion inside a rotary tube, or by fluidizing it.

6. The process of claim 1, wherein the sodium tripolyphosphate is kept in motion until complete hydration.

7. In the process of claim 1 the step of flowing a gas stream over the sodium tripolyphosphate which has been sprayed with water in a proportion greater than the stoichiometric proportion.

* * * * *